(No Model.) 2 Sheets—Sheet 1.
A. E. PEYRUSSON.
SECONDARY BATTERY.
No. 523,371. Patented July 24, 1894.
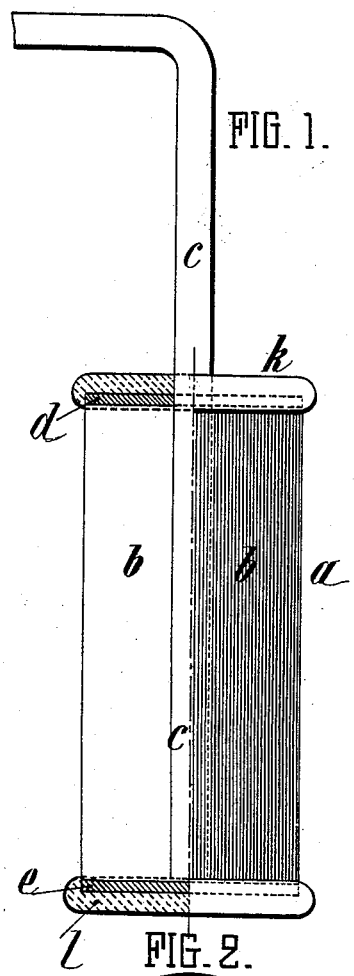
FIG. 1.
FIG. 2.
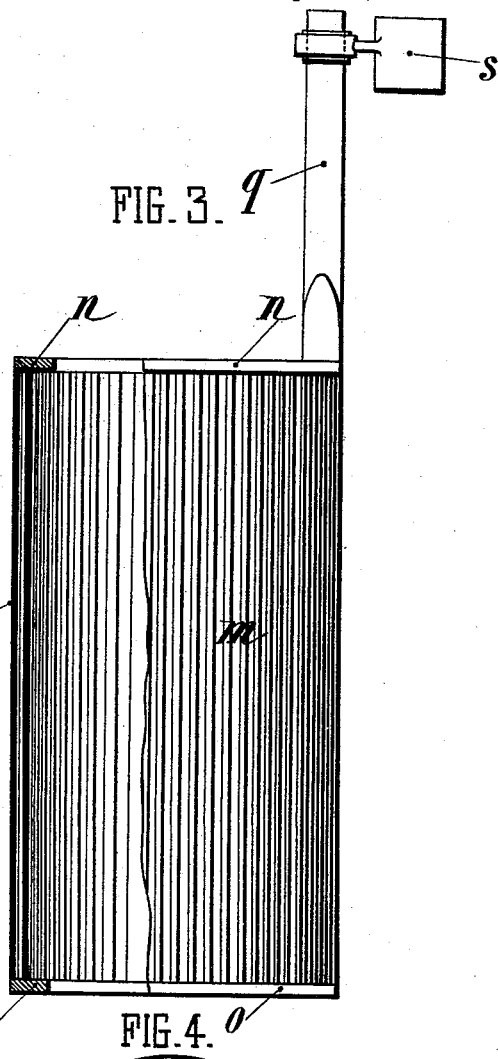
FIG. 3.
FIG. 4.
Witnesses:
L. M. Wachschlager,
Geo. E. Morris
Inventor
Antoine E. Peyrusson
By Briesen & Knauth
his Attorneys.

(No Model.) 2 Sheets—Sheet 2.
A. E. PEYRUSSON.
SECONDARY BATTERY.
No. 523,371. Patented July 24, 1894.
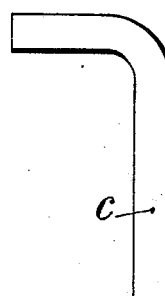
FIG. 5.
FIG. 7.
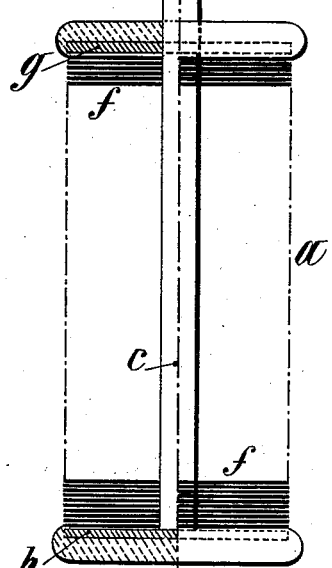
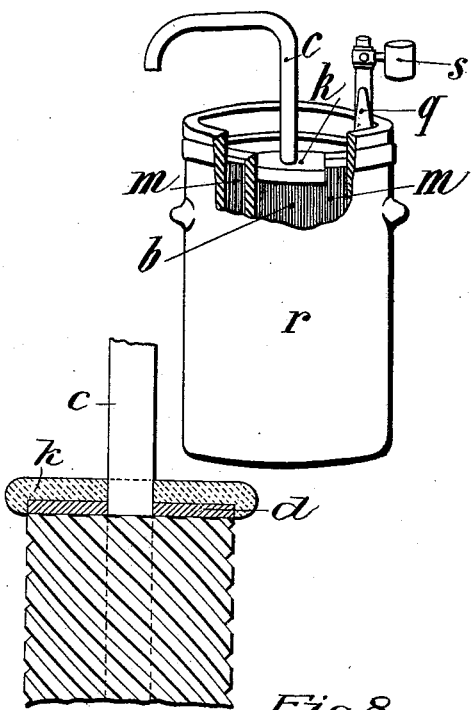
FIG. 6.
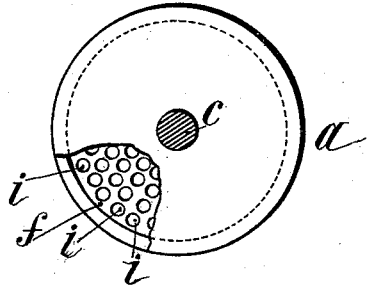
Fig. 8.
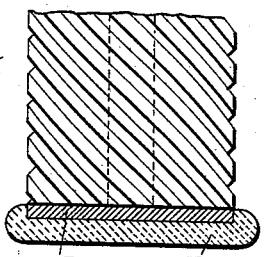
Witnesses:
Inventor
Antoine E. Peyrusson
By Briesen & Knauth
his Attorneys.

UNITED STATES PATENT OFFICE.

ANTOINE EDOUARD PEYRUSSON, OF LIMOGES, FRANCE.

SECONDARY BATTERY.

SPECIFICATION forming part of Letters Patent No. 523,371, dated July 24, 1894.

Application filed November 1, 1893. Serial No. 489,688. (No model.) Patented in France April 1, 1893, No. 229,096.

*To all whom it may concern:*

Be it known that I, ANTOINE EDOUARD PEYRUSSON, of the city of Limoges, France, have invented Improvements in Secondary Batteries or Accumulators, (for which I have obtained Letters Patent in France for fifteen years, dated April 1, 1893, No. 229,096,) of which the following is a full, clear, and exact description.

My invention consists in improvements in that class of secondary batteries which are constituted of thin metal plates or laminæ fixed in a rigid frame, and it has more particularly for its objects to render such batteries more solid and compact than hitherto as well as to increase their capacity.

The invention is illustrated in the accompanying drawings, forming part of this specification, Figure 1 of which is a part sectional elevation, and Fig. 2 a part sectional plan of the positive electrode. Fig. 3 is a part sectional elevation, and Fig. 4 a part sectional plan of the negative electrode. Fig. 5 represents a positive electrode formed of horizontal disks. Fig. 6 is a plan of one of the disks. Fig. 7 is a perspective view of the accumulator. Fig. 8 is a side elevation partly in section of another form of positive electrode.

The positive electrode $a$ is constructed of a number of very thin lead strips or laminæ $b$ autogenously soldered to a central rod $c$ of pure or antimoniated lead. The strips may be arranged vertically, as in Fig. 1, in which case their ends are soldered to disks $d$, $e$, of pure or antimoniated lead of a few millimeters in thickness, each strip being thus secured at three of its edges and being free at its outer edge only. The number of these strips should be considerable so as to themselves constitute the positive electrode without the addition of a material such as litharge, red lead, &c. In this manner the electrolyte is brought more intimately into contact with the strips or laminæ. The strips instead of being vertical may be spirally arranged and more or less close together upon the central rod $c$. The positive electrode may also be composed of horizontal disks $f$, as shown in Figs. 5 and 6, disposed at a very slight distance apart upon the central rod $c$ to which they are attached so as to form an integral portion thereof by autogenous soldering. The thickness of the two end disks $g$, $h$, is somewhat greater than that of the intermediate disks, so as to afford protection to the latter which are of very thin metal. The disks $f$ are pierced with holes $i$ as shown in the plan Fig. 6, to permit of the circulation of the liquid.

It will be observed that in either case the positive electrode is of cylindrical form. The ends of the positive electrode are inclosed by caps or covers $k$, $l$, of glass, porcelain, gutta-percha, or other insulating material, of slightly larger diameter than that of the cylder constituting the positive electrode so that the caps or covers will bear against the negative electrode and thus prevent all possibility of contact between the two electrodes.

The negative electrode is constituted by lead plates $m$ corrugated as shown in Figs. 3 and 4. According to my invention the lead plates $m$ are coiled in the form of a hollow cylinder and each corrugation or fold is slit for a portion of its length, in order that both faces of the negative electrode may be rendered active and the capacity increased. The ends of the plates $m$ are inserted in and intimately soldered to top and bottom rings $n$, $o$, of pure or antimoniated lead. The parts are thus rigidly secured together; this result being further insured by the employment of a number of sufficiently-strong vertical strips $p$, which serve to unite the corrugated plates $m$ to which they are autogenously soldered. The strips $p$ are also soldered to the rings $n$, $o$; and one of them is continued upward to form a conducting tang $q$. The negative electrode in this manner constitutes a hollow cylinder in which the cylindrical positive electrode is received with an intervening space of about two-fifths of an inch, all contact between the two electrodes being prevented by the employment of insulating caps or covers $k$, $l$, as before explained. The two electrodes are plunged in a sulphuric acid solution at 25° Baumé contained in a suitable vessel $r$.

The accumulator is formed by reversing the direction of the charging currents, as for a Planté cell.

By constructing the electrodes in the above manner of very thin lead strips or laminæ held in frames of pure or antimoniated lead, accumulators possessing large area combined with great strength may be constructed.

Instead of employing brass terminals, the contacts may be formed by a cup $s$, containing mercury, mounted upon the tang $q$ of the negative electrode as shown in Figs. 3 and 7, in which dips the tang $c$ of the positive electrode of the adjacent cell.

The invention is not limited to lead accumulators but may be adapted to others, for example those in which alkalies are employed, the lead plates being in this case replaced by plates of copper or other metal unattackable by the alkalies.

I claim—

1. In an accumulator, a positive electrode the same consisting of metallic laminæ, soldered to a central metallic core, end disks of lead retaining said laminæ, capping disks of insulating material covering and projecting beyond the lead disks so as to prevent all contact thereof with the negative electrode, as specified.

2. In an accumulator, a positive electrode the same consisting of metallic laminæ, soldered to a central metallic core, end disks of lead retaining said laminæ, capping disks of insulating material covering and projecting beyond the lead disks so as to prevent all contact thereof with the negative electrode, with a negative electrode the same consisting of longitudinally corrugated metallic plates rolled in the form of a hollow cylinder, each ply being slitted for a portion of its length, the said plates being inserted in, and soldered to, an end ring of lead, as specified.

The foregoing specification of my improvements in secondary batteries or accumulators signed by me this 17th day of October, 1893.

ANTOINE EDOUARD PEYRUSSON.

Witnesses:
WALTER T. GRIFFIN,
I. S. GRAVES.